United States Patent
Neven

(10) Patent No.: US 9,829,359 B2
(45) Date of Patent: Nov. 28, 2017

(54) METHOD FOR PRODUCTION OF A MAGNETIC-INDUCTIVE FLOW METER

(71) Applicant: Krohne AG, Basel (CH)

(72) Inventor: Josef Neven, Mours St. Eusèbe (FR)

(73) Assignee: Krohne AG, Basel (CH)

( * ) Notice: Subject to any disclaimer, the term of this patent is extended or adjusted under 35 U.S.C. 154(b) by 187 days.

(21) Appl. No.: 14/753,504

(22) Filed: Jun. 29, 2015

(65) Prior Publication Data

US 2015/0300852 A1    Oct. 22, 2015

Related U.S. Application Data

(62) Division of application No. 13/946,253, filed on Jul. 19, 2013, now Pat. No. 9,121,740.

(30) Foreign Application Priority Data

Aug. 21, 2012    (DE) .................. 10 2012 016 407
Sep. 11, 2012    (DE) .................. 10 2012 017 904

(51) Int. Cl.
*G01F 1/58*    (2006.01)

(52) U.S. Cl.
CPC .............. *G01F 1/588* (2013.01); *G01F 1/584* (2013.01); *Y10T 29/49117* (2015.01)

(58) Field of Classification Search
CPC ....... H04W 48/18; H04W 60/04; G01F 1/584; G01F 1/588; Y10T 29/49117
See application file for complete search history.

(56) References Cited

U.S. PATENT DOCUMENTS

| | | |
|---|---|---|
| 5,280,727 A | 1/1994 | Hafner et al. |
| 5,337,607 A | 8/1994 | Brown |
| 5,503,026 A | 4/1996 | Bohm et al. |
| 5,955,681 A | 9/1999 | Hafner et al. |

(Continued)

FOREIGN PATENT DOCUMENTS

| | | |
|---|---|---|
| DE | 19708857 A1 | 7/1998 |
| DE | 102004063617 A1 | 6/2006 |

(Continued)

*Primary Examiner* — Minh Trinh
(74) *Attorney, Agent, or Firm* — David S. Safran

(57) ABSTRACT

A method of producing a magnetic-inductive flow meter with at least one measurement tube, a magnetic field generating apparatus for generating a magnetic field which runs at least also perpendicular to the longitudinal axis of the measurement tube, and two measurement electrodes, the measurement tube having a metallic base body provided with a thermoplastic cover layer, a virtual connecting line of the two measurement electrodes running perpendicular to the direction of the magnetic field which is permeating the measurement tube perpendicular to the longitudinal axis of the measurement tube. The penetration sites of the measurement tube at which the measurement electrodes penetrate the measurement tube are easily made liquid-tight by a liquid-tight connection which has been produced by heating of the cover layer at the penetration sites for sealing the thermoplastic cover layer of the measurement tube to the measurement electrodes.

4 Claims, 3 Drawing Sheets

(56) References Cited

U.S. PATENT DOCUMENTS

| | | | |
|---|---|---|---|
| 6,092,428 A * | 7/2000 | Brockhaus | G01F 1/002 |
| | | | 73/861.14 |
| 7,261,001 B2 | 8/2007 | Heijnsdijk et al. | |
| 8,286,502 B2 | 10/2012 | Pelayo | |
| 8,286,503 B2 | 10/2012 | Neuburger et al. | |
| 8,881,602 B2 * | 11/2014 | van Willigen | G01F 1/588 |
| | | | 73/861.12 |
| 8,915,146 B2 | 12/2014 | Kerrom et al. | |
| 9,121,740 B2 * | 9/2015 | Neven | G01F 1/588 |
| 2006/0144161 A1 | 7/2006 | Heijnsdijk et al. | |
| 2010/0132479 A1 | 6/2010 | Van Willigen | |
| 2012/0304780 A1 | 12/2012 | Walbrecker et al. | |
| 2015/0300852 A1 * | 10/2015 | Neven | G01F 1/588 |
| | | | 29/602.1 |

FOREIGN PATENT DOCUMENTS

| | | | |
|---|---|---|---|
| DE | 102005030193 A1 | 1/2007 | |
| DE | 102008057755 A1 | 5/2010 | |
| DE | 102008057756 A1 | 5/2010 | |
| EP | 0306895 A2 | 3/1989 | |
| EP | 0608793 A2 | 8/1994 | |
| JP | 56164917 A | 12/1981 | |

\* cited by examiner

METHOD FOR PRODUCTION OF A MAGNETIC-INDUCTIVE FLOW METER

CROSS REFERENCE TO RELATED APPLICATION

This application is a division of commonly owned, U.S. patent application Ser. No. 13/946,253, filed on Jul. 19, 2013, now U.S. Pat. No. 9,121,740.

BACKGROUND OF THE INVENTION

Field of the Invention

The invention relates to a magnetic-inductive flow meter, with at least one measurement tube for through-flow of an electrically conductive medium, with at least one magnetic field generating apparatus for generating a magnetic field which runs at least also perpendicular to the longitudinal axis of the measurement tube, and with at least two measurement electrodes, the measurement tube having a metallic base body and the base body being provided with a thermoplastic cover layer at least on the inside of the measurement tube, and the virtual connecting line of the two measurement electrodes running at least essentially perpendicular to the direction of the magnetic field which is permeating the measurement tube perpendicular to the longitudinal axis of the measurement tube. The invention also relates to a method for producing such a magnetic-inductive flow meter.

Description of Related Art

Magnetic-inductive flow meters have been widely known in the prior art for decades. Reference is made by way of example to the literature citation *Technical Flow Rate Measurement* by Dr. Eng. K. W. Bonfig, 3rd edition, Vulcan-Verlag Essen, 2002, pp. 123 to 167 and moreover to the literature citation *Principles of Magnetic-Inductive Flow Rate Measurement* by Cert. Eng. Friedrich Hoffmann, 3rd ed., publication of the company KROHNE Messtechnik GmbH & Co. KG, 2003.

The basic principle of a magnetic-inductive flow meter for measuring the flow rate of a flowing medium goes back to Michael Faraday who suggested the use of the principle of electromagnetic induction for measuring the flow velocity of an electrically conductive medium as early as 1832.

According to the Faraday Induction Law, in a flowing, electrically conductive medium which is permeated by a magnetic field, an electric field intensity arises perpendicular to the flow direction of the medium and perpendicular to the magnetic field. The Faraday Induction Law is used in magnetic-inductive flow meters in that, by means of a magnetic field generating apparatus which has at least one magnetic field coil, conventionally two magnetic field coils, a magnetic field which changes over time during a measurement process is generated and the magnetic field at least partially permeates the electrically conductive medium which is flowing through a measurement tube. The generated magnetic field has at least one component perpendicular to the longitudinal axis of the measurement tube and perpendicular to the flow direction of the medium.

It was stated at the beginning that the measurement tube has a metallic base body and the base body is provided with a thermoplastic cover layer on at least the inside of the measurement tube. Instead of such a measurement tube, there can also be a measurement tube which, instead of a metallic base body, has a nonmetallic base body, for example, a ceramic base body. Here, magnetic-inductive flow meters will also be encompassed in which the measurement tube is formed entirely of a thermoplastic material. But, it is always assumed below that the measurement tube has a metallic base body and the base body tube is provided with a thermoplastic cover layer on at least the inside of the measurement. The formulation "at least on the inside of the measurement tube" of course also comprises an embodiment in which the base body is provided on all sides with a thermoplastic cover layer.

With regard to the statement at the beginning that the magnetic-inductive flow meter under discussion includes at least one magnetic field generating apparatus "for producing a magnetic field which runs at least also perpendicular to the longitudinal axis of the measurement tube", it is pointed out again here that the magnetic field does run preferably perpendicular to the longitudinal axis of the measurement tube and perpendicular to the flow direction of the medium, but it is sufficient that one component of the magnetic field runs perpendicular to the longitudinal axis of the measurement tube and perpendicular to the flow direction of the medium.

It was also stated at the beginning that the magnetic-inductive flow meter under discussion includes at least two measurement electrodes, the virtual connecting line of the two measurement electrodes running at least essentially perpendicular to the direction of the magnetic field which is permeating the measurement tube. Preferably, the virtual connecting line of the two measurement electrodes in fact runs more or less perpendicular to the direction of the magnetic field which permeates the measurement tube.

The electrical field intensity which is produced by induction in the flowing, electrically conductive medium can be measured by measurement electrodes which are directly, therefore electrically in contact with the medium as electrical voltage or also can be capacitively detected by electrodes which are not directly, therefore not electrically in contact with the medium. Here, it is a matter of magnetic-inductive flow meters in which the electrical field intensity produced by induction in the flowing, electrically conductive medium is measured by measurement electrodes which are directly, therefore electrically in contact with the medium as electrical voltage.

The measurement error in the magnetic-inductive flow meters known from the prior art is relatively small today; a measurement error less than 0.2% can be accomplished.

For the known magnetic-inductive flow meters, reference is made by way of example to the German patent disclosure document 197 08 857, 10 2004 063 617 and corresponding U.S. Pat. No. 7,261,001, German patent disclosure document 10 2008 057 755 and corresponding U.S. Pat. No. 8,286,503, German patent disclosure document 10 2008 057 756 and corresponding U.S. Pat. No. 8,286,502 and commonly owned, unpublished U.S. Pat. No. 9,091,574. The disclosure content of the aforementioned documents which were published beforehand are hereby expressly in corporate by reference in this patent application as is the substance of the co-pending U.S. Pat. No. 9,091,574.

SUMMARY OF THE INVENTION

It was already stated above that, here, it is a matter of magnetic-inductive flow meters in which the electrical field intensity produced by induction in the flowing, electrically conductive medium is measured by measurement electrodes which are directly, therefore electrically in contact with the medium as electrical voltage. Therefore, a primary object of the present invention is to devise a magnetic-inductive flow meter of the initially described type in which the penetration sites of the measurement tube, therefore the sites at which the measurement electrodes penetrate the measurement tube, can be easily implemented in a liquid-tight manner, and to devise a method with which the above explained penetration sites can be easily implemented liquid-tight, therefore the measurement electrodes can be easily implemented liquid-tight, penetrating the measurement tube.

The magnetic-inductive flow meter of the invention in which the aforementioned object is achieved is, first of all, essentially characterized in that at the penetration sites—sites at which the measurement electrodes penetrate the measurement tube—a liquid-tight connection which has been produced by heating of the cover layer is implemented between the thermoplastic cover layer of the measurement tube and the measurement electrodes.

In the magnetic-inductive flow meter in accordance with the invention it is, first of all, important that the cover layer with which the base body of the measurement tube is provided is also implemented within the penetration sites. Therefore, reference to the base body being provided with a thermoplastic cover layer at least on the inside of the measurement tube is intended to include the fact that the thermoplastic cover layer extends out of the base body into the penetration sites. As a result, it is not necessary for the thermoplastic cover layer to also be implemented on the outside of the measurement tube of the base body, even if it is considered advantageous and preferable for the measurement tube of the magnetic-inductive flow meter in accordance with the invention that the base body be provided on all sides with a thermoplastic cover layer, therefore this thermoplastic cover layer is provided on the inside of the measurement tube of the base body, the outside of the measurement tube of the base body and in the region of the penetration sites, the base body is therefore completely surrounded by the thermoplastic cover layer, therefore also in the region of the penetration sites.

So that the measurement electrodes can be placed relatively easily in the measurement tube, therefore can be inserted into the penetration sites, the outside diameter of the measurement electrodes in the region of the penetration sites is slightly smaller than the inside diameter of the penetration sites.

Otherwise, one preferred embodiment of the magnetic-inductive flow meter in accordance with the invention is characterized in that the measurement electrodes have a collar which adjoins the measurement tube on the outside and the measurement tube in the region of the penetration sites has contact surfaces for the collar of the measurement electrodes. These contact surfaces are, first of all, helpful when the measurement electrodes are placed in the penetration sites of the measurement tube. They are essentially used as a stop so that the measurement electrodes can be correctly placed by their being introduced into the penetration sites of the measurement tube so far that the collar which lies outside comes into contact with the contact surface. Moreover, in this embodiment, a liquid-tight connection is formed between the collar of the measurement electrodes and the contact surfaces which are implemented on the measurement electrode in the region of the penetration sites when the thermoplastic cover layer, as described as advantageous above, completely surrounds the base body, therefore is located not only in the region of the penetration sites, but also in the region of the contact surfaces.

What was explained at the introduction and what was explained with reference to the object of the invention indicate that the subject matter of the invention is not only the above described magnetic-inductive flow meter, but also is a method for producing such a magnetic-inductive flow meter. That the production of the magnetic-inductive flow meter in accordance with the invention can also have special importance also results from what was stated above.

The method in accordance with the invention for producing a magnetic-inductive flow meter of the above described type is, first of all, characterized essentially in that first the penetration sites which are used for penetration of the measurement electrodes through the measurement tube are placed in the base body of the measurement tube, preferably by drilling, that then the base body—in any case, in the region of the penetration sites—is provided with a thermoplastic cover layer and that finally the measurement electrodes are connected fluid-tight to the measurement tube by heating the cover layer in the region of the penetration sites.

In the second method step, the base body is provided, in any case, with a thermoplastic cover layer in the region of the penetration sites, and this takes into account the fact that, on the one hand, the thermoplastic cover layer is critical to operation only in the region of the penetration sites, and on the other hand, that the thermoplastic cover layer can also be implemented on the inside of the measurement tube before the penetration sites which are used for penetration of the measurement electrodes through the measurement tube are placed in the base body of the measurement tube. However, preferably, first of all, the base body which is free of the cover layer is provided with the penetration sites, and afterwards, the base body is provided completely with a thermoplastic cover layer, therefore on the inside of the measurement tube, the outside of the measurement tube, and, connecting the inside of the measurement tube to the outside of the measurement tube, in the region of the penetration sites.

As the third method step, the liquid-tight connection of the measurement electrode to the measurement tube was treated above, specifically by the step of heating the thermoplastic cover layer in accordance with the invention in the region of the penetration sites.

The latter described method step of the production of a magnetic-inductive flow meter in accordance with the invention can be carried out differently. One possibility is that the measurement electrodes are heated to the temperature which is necessary for the connection of the measurement electrodes to the cover layer of the measurement tube, and then, preferably with a small penetration force, they are placed in the penetration sites. Another possibility is characterized in that the measurement electrodes are first placed in the penetration sites, and when they have been placed in the penetration sites, they are heated to the temperature which is necessary for the connection of the measurement electrodes to the cover layer of the measurement tube, preferably by inductive heating. The latter described possibility has the advantage over the first described possibility that hot articles, specifically preheated measurement electrodes, need not be handled.

A thermoplastic cover layer is critical for the magnetic-inductive flow meter in accordance with the invention and critical for the method in accordance with the invention for producing the magnetic-inductive flow meter in accordance with the invention; the thermoplastic cover layer at least partially, preferably completely covers the base body of the measurement tube and melts on its surface when heated such that a liquid-tight connection is formed with the measurement electrodes in place.

A suitable material for the thermoplastic cover layer is especially one which is sold under the trademark RILSAN®. The chemical name for this material is polyamide 11. It is a powdered thermoplastic which is produced on the basis of vegetable castor oil. In doing so, castor oil is processed into a monomer from which polyamide 11 is formed by polymerization.

The advantages which have been achieved in accordance with the invention, both in the magnetic-inductive flow meter in accordance with the invention and also in the method in accordance with the invention for producing a magnetic-inductive flow meter, are mainly, especially when it is considered that the magnetic-inductive flow meters in accordance with the invention can be mass produced products, that in an especially simple and economical manner a liquid-tight connection is achieved between the measurement electrodes which have been placed in the measurement tube and the measurement tube. For liquid-tight connection a special sealing means is not necessary, therefore for example neither an O-ring nor complex screwing-in of the measurement electrodes.

In particular, there are now various possibilities for embodying and developing the magnetic-inductive flow meter in accordance with the invention and the method in accordance with the invention for producing this magnetic-inductive flow meter which will be apparent from detailed description of an exemplary embodiment of a magnetic-inductive flow meter in accordance with the invention which is shown relatively schematically in the drawings.

DETAILED DESCRIPTION OF THE INVENTION

Figure 1:
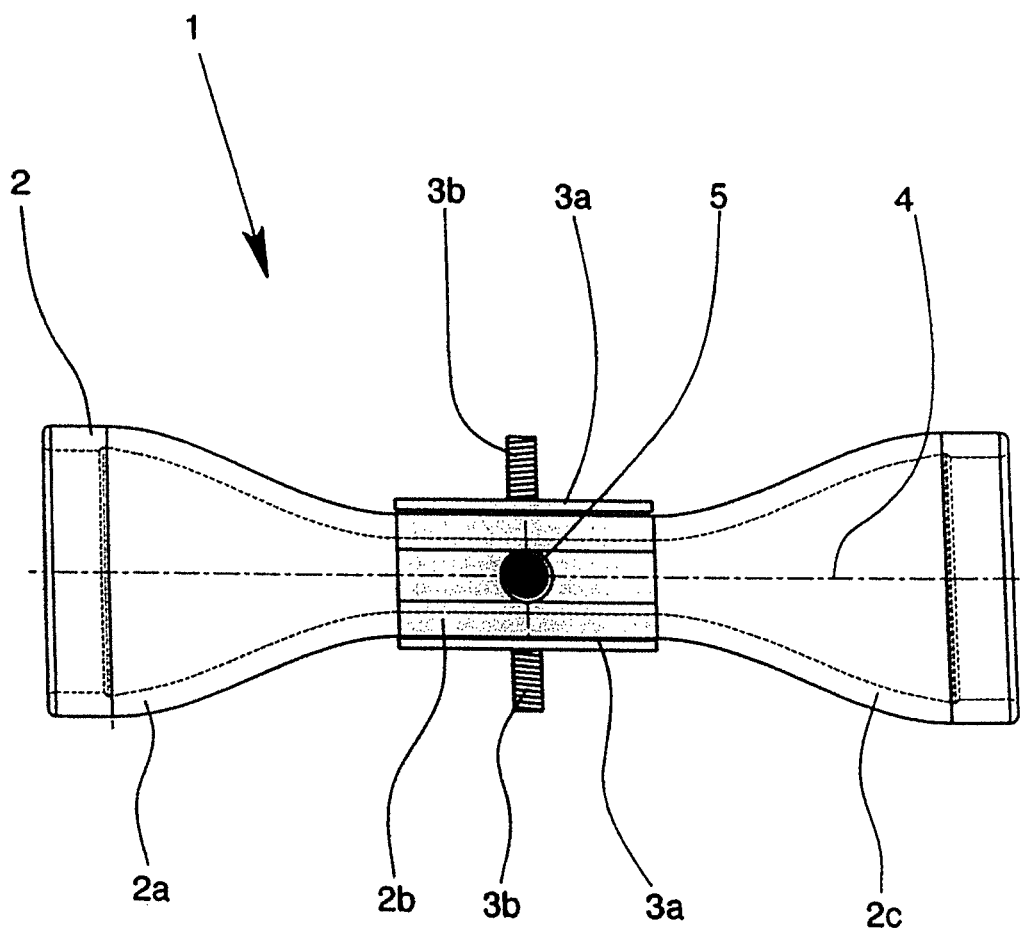
FIG. 1 schematically shows a magnetic-inductive flow meter in accordance with the invention in its basic assembly size.

FIG. 1 shows, only schematically, a magnetic-inductive flow meter 1 with a measurement tube 2 for the through-flow of an electrically conductive medium, with a magnetic field generating apparatus for producing a magnetic field which runs at least also perpendicular to the longitudinal axis 4 of the measurement tube 2 and with two measurement electrodes 5, 6, the measurement tube 1, both of which is only shown in FIG. 5, having a metallic base body 7 and the base body 7 being provided on all sides with a thermoplastic cover layer 8 and the virtual connecting line 9 of the two measurement electrodes 5, 6 running perpendicular to the direction of the magnetic field which is permeating the measurement tube 2 perpendicular to the longitudinal axis 4 of the measurement tube 2.

In particular, the measurement tube 2 has an inflow section 2a, a measurement section 2b which adjoins the inflow section 2a, and an outflow section 2c which adjoins the measurement section 2b.

In FIG. 1, it is only suggested that two hollow plates 3a and two magnet coils 3b belong to the magnetic field generating apparatus.

Figure 2:
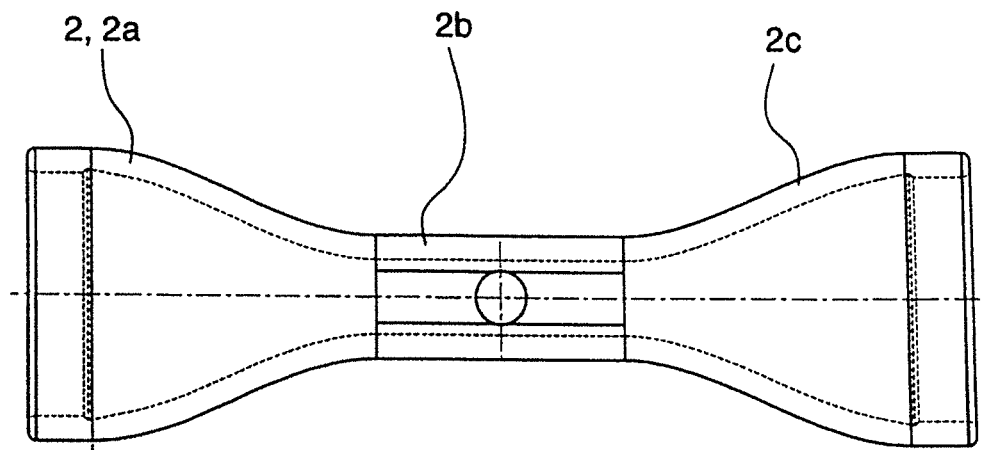
FIG. 2 shows the measurement tube of the magnetic-inductive flow meter as shown in FIG. 1, in a schematic section.
Figure 3:
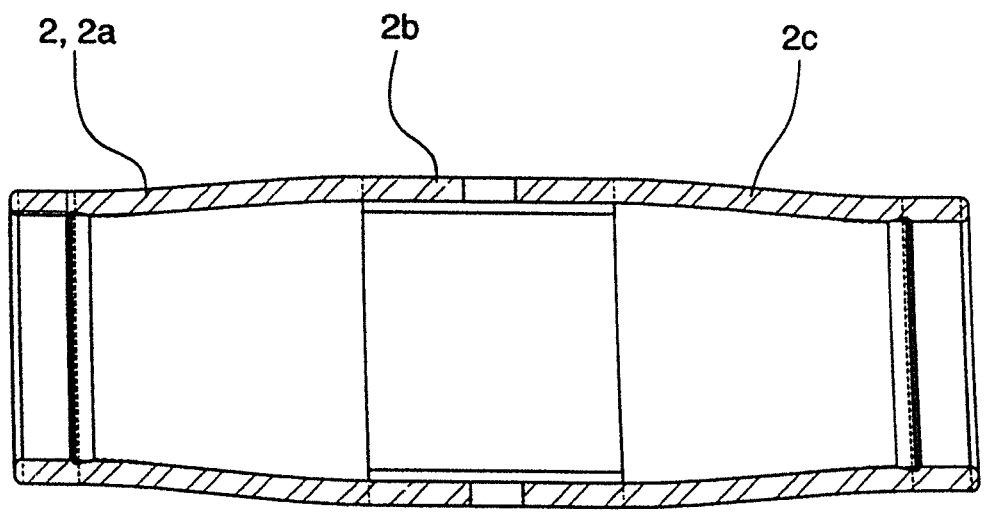
FIG. 3 shows the measurement tube as shown in FIG. 2, in another side view, also again in a section, FIG. 4 schematically shows the cross section of the measurement section of the measurement tube as shown in FIGS. 1 to 3, in the region of the measurement electrodes which are not shown.
Figure 4:
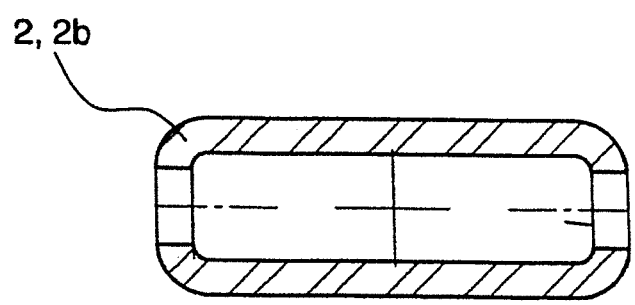

It applies to the exemplary embodiment of a magnetic-inductive flow meter 1 in accordance with the invention shown in the figures, as FIGS. 1, 2 and 3 show, that the measurement tube 2 has a circular cross section at the start of the inflow section 2a and at the end of the outflow section 2c. In contrast, the measurement tube 2 in the region of the measurement section 2b has a more or less rectangular cross section; this is shown by a comparison of FIGS. 1 and 2 on the one hand with FIG. 3 on the other, but mainly by FIGS. 4 and 5.

With regard to what is achieved by the geometry of the measurement tube 2 which is shown in the figures, reference is made to commonly owned U.S. Pat. No. 9,091,574.

Figure 5A:
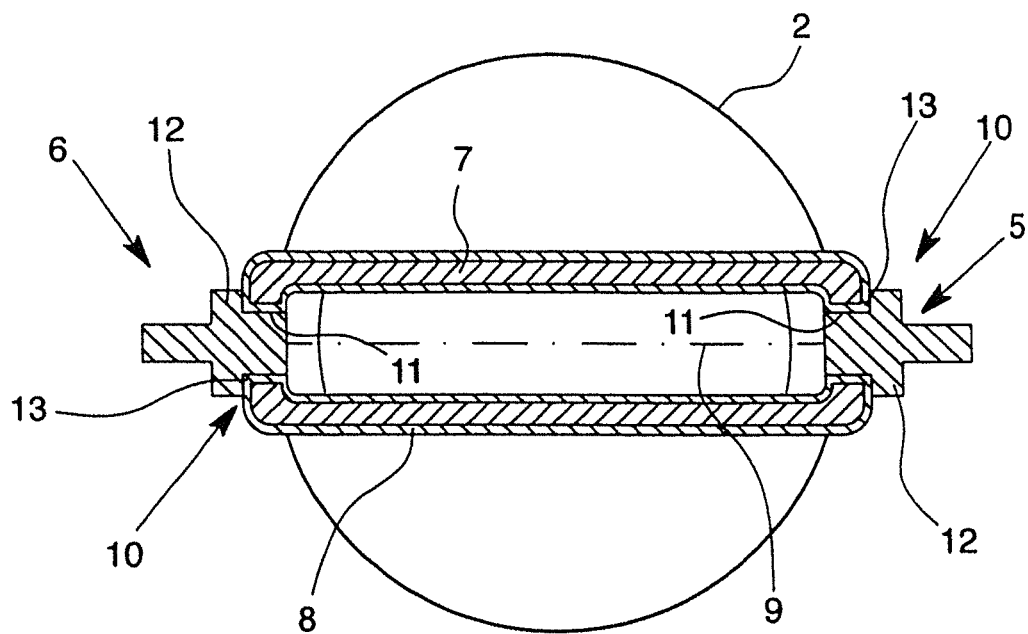
FIGS. 5a & 5b show, in views which have been enlarged compared to FIG. 4, the cross section of the measurement section of the measurement tube according to FIGS. 1 to 3 in the region of the measurement electrodes, with the measurement electrodes placed in the measurement tube.
Figure 5B:
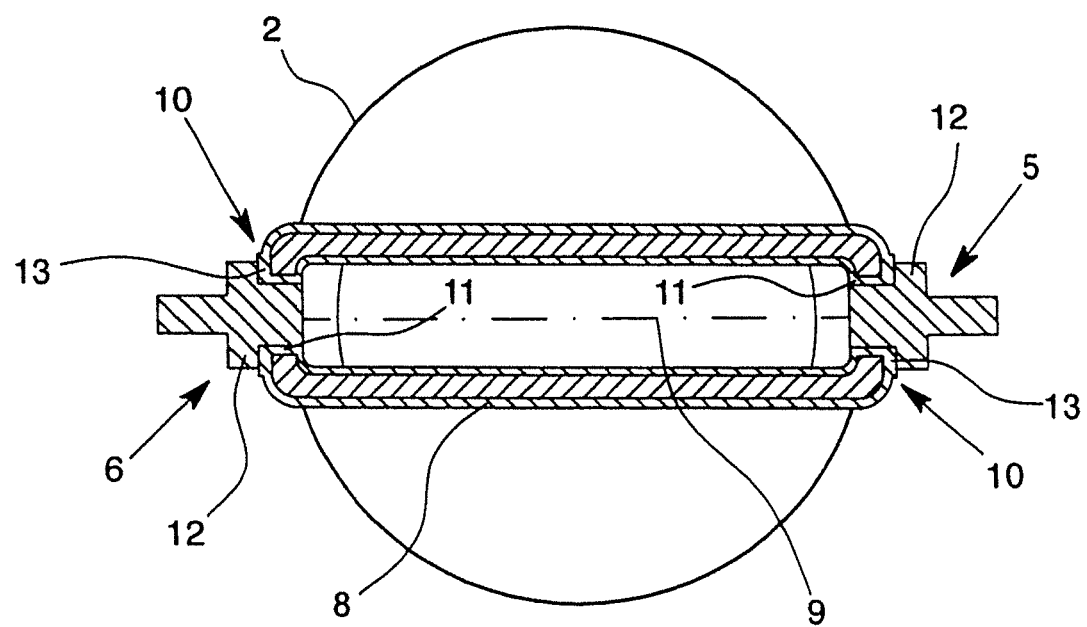

As FIGS. 5a and 5b, show, a liquid-tight connection has been formed by heating of the cover layer 8 at the penetration sites 10—sites at which the measurement electrodes 5, 6 penetrate the measurement tube 2 in the region of the measurement section 2b—between the thermoplastic cover layer 8 of the measurement tube 2 and the measurement electrodes 5 and 6.

It noted that the outside diameter of the measurement electrodes 5, 6 in the region in which they are located in the area of the penetration sites 10 is slightly smaller than the inside diameter of the penetration sites 10 prior to melting of cover layer 8.

Otherwise, FIGS. 5a and 5b show a preferred exemplary embodiment of the magnetic-inductive flow meter 1 in accordance with the invention to the extent the measurement electrodes 5, 6 have a collar 12 which adjoins the measurement tube 2 in the region of the measurement section 2b on the outside, and the measurement tube 2 in the region of the penetration sites 10 has contact surfaces 13 for the collar 12 of the measurement electrodes 5, 6. In the exemplary embodiment according to FIG. 5b, the base body 7 has a continuously uniform wall thickness and the cover layer 8 for implementation of the contact surfaces has a somewhat greater wall thickness. In contrast, it applies to the exemplary embodiment as shown in FIG. 5a that the base body 7 has a greater wall thickness for implementing the contact surfaces 13 in the corresponding region, while the cover layer 8 generally has a wall thickness which remains the same.

It applies to the production of the above explained magnetic-inductive flow meter 1 in accordance with the invention that first the penetration sites which are used for penetration of the measurement electrodes 5, 6 through the measurement tube 2 are placed in the base body 7 of the measurement tube 2, of course, in the region of the measurement section 2b, preferably by drilling, that then the base body 7—in any case in the region of the penetration sites 10, but preferably entirely—is provided with a thermoplastic cover layer 8, and that finally, the measurement electrodes 5, 6 are connected fluid-tight to the measurement tube 2 by heating the thermoplastic cover layer 8 in the region of the penetration sites 10.

The above explained third method step, the liquid-tight connection of the measurement electrodes 5, 6 to the measurement tube 2, can be carried out differently. One possibility is to heat the measurement electrodes 5, 6, to the temperature which is necessary for the connection of the measurement electrodes 5, 6 to the cover layer 8 of the measurement tube 2 prior to insertion, and then, preferably with a small penetration force, to place the heated measurement electrodes 5, 6 in the penetration sites 10. Another, and especially a preferred procedure, is characterized in that the measurement electrodes 5, 6 are first placed in the penetration sites 10 of the measurement tube 2 and when they have been placed in the penetration sites 10, they are heated to the temperature necessary for the connection of the measurement electrodes 5, 6 to the cover layer of the measurement tube 2; this can take place preferably by inductive heating.

What is claimed is:

1. A method for producing a magnetic-inductive flow meter having at least one measurement tube for throughflow of an electrically conductive medium having a metallic base body having a thermoplastic cover layer at least on an inside of the measurement tube, at least one magnetic field generating apparatus for generating a magnetic field which runs at least also perpendicular to the longitudinal axis of the measurement tube and which permeates the measurement tube perpendicular to a longitudinal axis of the measurement tube, and with at least two measurement electrodes, a virtual connecting line of the at least two measurement electrodes running at least essentially perpendicular to the direction of the magnetic field,
comprising the steps of:
first, forming penetration sites for penetration of the at least two measurement electrodes through the measurement tube in the metallic base body of the measurement tube,
then, providing the base body with a thermoplastic cover layer at least in a region of the penetration sites,
inserting a longitudinal end of the at least two measurement electrodes into the penetration sites so as to extend perpendicular to a lengthwise direction of the measurement tube, and
then, connecting the at least two measurement electrodes to the measurement tube in a fluid-tight manner at the penetration sites by heating the thermoplastic cover layer in the region of the penetration sites so as to heat seal the thermoplastic cover layer of the measurement tube to the at least two measurement electrodes at the penetration sites, and
positioning at least one magnetic field generating apparatus at a location relative to the measuring tube for generating a magnetic field which runs at least also perpendicular to the longitudinal axis of the measurement tube and which permeates the measurement tube perpendicular to a longitudinal axis of the measurement tube and perpendicular to a virtual connecting line of the at least two measurement electrodes.

2. The method in accordance with claim 1, wherein the heating of the thermoplastic cover layer in the region of the penetration sites is performed by heating the at least two measurement electrodes to a temperature sufficient to connect the at least two measurement electrodes to the cover layer of the measurement tube and then placing the at least two measurement electrodes in the penetration sites.

3. The method in accordance with claim 1, comprising the further steps of placing the measurement electrodes in the penetration sites and then heating the thermoplastic cover layer in the region of the penetration sites is performed by the measurement electrodes being heated to a temperature sufficient to connect the measurement electrodes to the cover layer of the measurement tube.

4. The method in accordance with claim 3, wherein the heating of the at least two measurement electrodes is performed by inductive heating.

* * * * *